Aug. 14, 1951     K. A. BEVINGTON     2,564,049
CONFECTIONERY ARTICLE
Filed Oct. 30, 1948
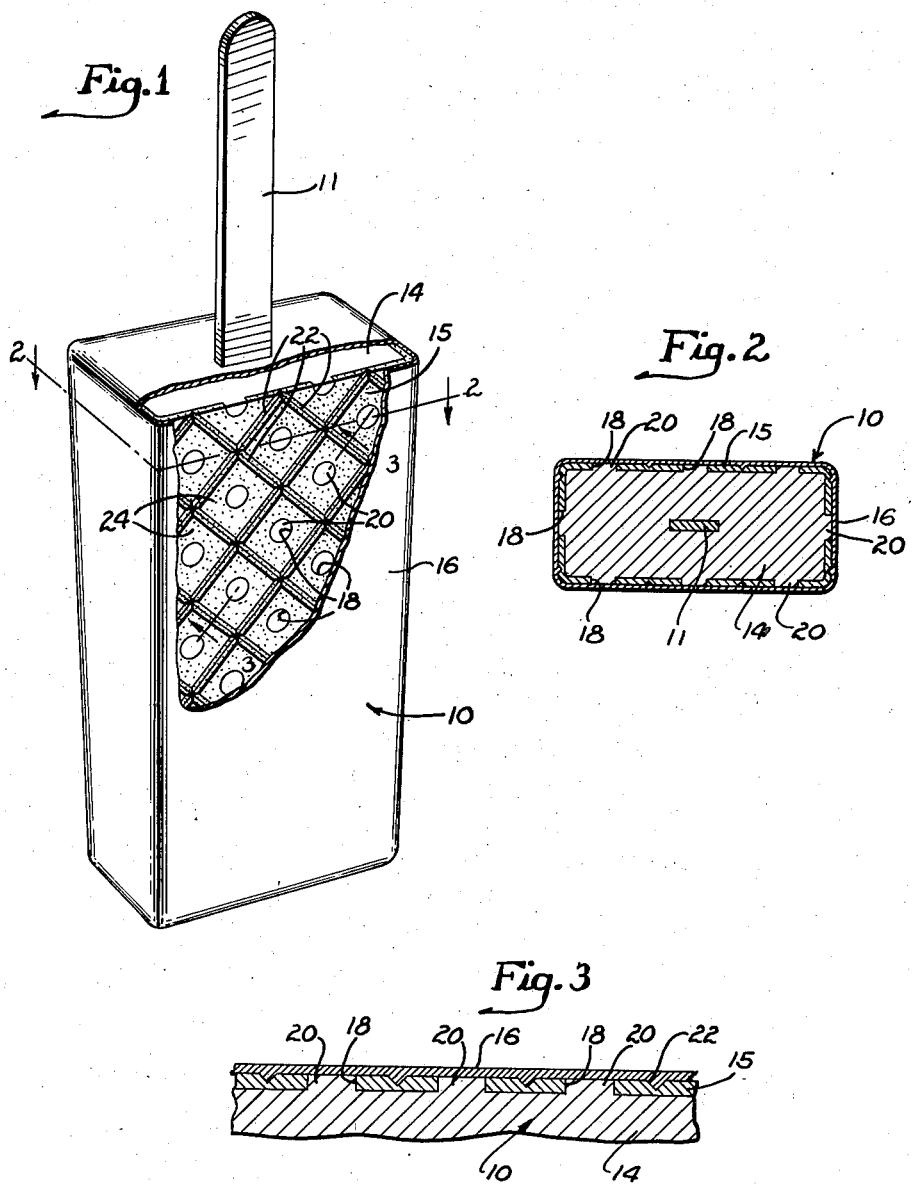
INVENTOR.
Kenneth A. Bevington
BY Bair & Freeman
Attys.

UNITED STATES PATENT OFFICE 2,564,049

CONFECTIONERY ARTICLE

Kenneth A. Bevington, Evanston, Ill.

Application October 30, 1948, Serial No. 57,470

10 Claims. (Cl. 99—137)

The present invention relates to a confectionery article, especially adapted for use in conjunction with frozen confectionery materials, such as ice cream, flavored ices, and similar frozen material of a confectionery nature.

One of the objects of the present invention resides in the provision of a body of cookie or cake-like material adapted to be frozen to the exterior, and constituting a direct part of a body of frozen confectionery material such as ice cream, flavored ices, etc.

Another object is to provide a novel confectionery article, made of cookie or cake-like material, formed so as to permit severance thereof into small pieces by application of force in the process of eating the article.

A further object is to provide a novel confectionery article in the nature of a shell, formed of cookie or cake-like material, and provided with a plurality of spaced, narrow areas, defining a plurality of small areas, and capable of rupturing mainly along said narrow areas upon application of force in the process of eating the article.

Still another object is to provide a novel confectionery article in the nature of a shell of cookie or cake-like material, adapted to contain a body of frozen confectionery material, and the shell being provided with a plurality of spaced openings into which said frozen confectionery material projects for assisting in securing said shell, throughout the major portion thereof, to said frozen body of confectionery material.

Other objects and advantages of this invention will be apparent from the following description, taken in connection with the accompanying drawing in which:

Figure 1 is a perspective view of an ice cream bar, with portions of the coating broken away to show the confectionery article embodying the present invention;

Figure 2 is a transverse section through the bar, taken substantially as indicated at line 2—2 on Figure 1, and Figure 3 is a fragmentary, enlarged sectional view through the outer wall portion of the bar and shell, taken substantially as indicated at line 3—3 on Figure 1.

In the drawing, the confectionery article embodying the present invention is shown as a part of an ice cream bar which is indicated generally at 10, and provided with a conventional supporting stick 11, frozen in position in the body thereof. The bar comprises a body of ice cream indicated at 14, surrounded by a shell 15 embodying the present invention. The shell is formed of cookie or cake-like material, and as shown in the drawing, the exposed surface of said shell as well as the remaining exposed surface of the body of ice cream, as indicated at 14 is provided with a suitable coating 16, such as chocolate or other coating material.

It is to be understood that the shell may be formed tubular in cross section, and provided either with or without a bottom wall as may be desired. The shell, preferably is dimensioned so as to permit placement in existing molds for forming of ice cream bars and the like, and the shell thus constituting a liner for the walls of such molds, and for the reception of a body of ice cream or other confectionery material therein and the filled shell may thereafter be handled and processed in a usual manner by present equipment as now used in the process of freezing and bagging ice cream bars and the like. Hence, no expenditure is necessary for additional equipment than heretofore used in the production of ice cream bars, all of which permits economy for the production of the novel confectionery article embodying the present invention.

As may be seen in the drawing, the shell is formed with a plurality of spaced apart openings 18, extending therethrough and into which flows a part of the body of material to be frozen preparatory to freezing. Thus when said material is frozen, the part extending into said openings forms a plurality of plugs or projections 20 fitted into the openings 18 of the shell, and constitute interlocking features for firmly securing the shell to the frozen body 14 of confectionery material. As shown, these openings are in the form of circular holes, and obviously, said openings may be of any desired form or configuration. By virtue of the interlocking features, comprising said plugs 20, and openings 18, it will be manifest that as the confectionery bar is being eaten, it will not be possible for large portions of the shell to become readily disengaged from the frozen body 14 and fall therefrom.

Either the inner or outer wall of the shell, and preferably the outer wall, as herein shown, is formed with a plurality of spaced, narrow, intersecting areas 22 of reduced thickness, thus defining a plurality of small areas, as indicated at 24 surrounded by said narrow areas 22. As shown, the openings 18 are located substantially centrally with respect to each of the small areas 24, although it will be manifest that said openings may be provided in any part of the small areas, or may be in registration with said narrow areas 22.

As may be seen in Figure 3 of the drawings, the narrow areas 22 are in the form of V-grooves. By virtue of dividing the main surfaces of the shell into a plurality of small areas, surrounded by narrow areas of reduced thickness, it will be manifest that in the process of eating the shell and/or the bar with which the shell may be associated, said shell will mainly rupture or sever along said narrow areas, and thus make eating of the shell alone, or as a part of a total confectionery article, more satisfactory from the standpoint that portions of the shell severed from the remaining body portion, will correspond quite closely to the extent of the bite thereinto, and will not result in large pieces of the shell breaking off in the process of eating the confectionery article.

Another and important advantage resulting from the provision of the reduced areas on the outer surface of the shell, particularly in the form of grooves, is that the coating 16 is caused to fill the grooves, and tends to cause said coating to anchor in position on the shell, and thus the coating will not readily become separated therefrom and break off in large pieces in the process of eating, such as usually occurs in cases where coating, such as chocolate is applied directly to ice cream bars and other frozen confectionery articles.

While I have herein shown the present invention in the form of a shell for surrounding a conventional form of bar of frozen confectionery material, it will be manifest that the present invention may assume the form of a cone, or may be of frustroconical formation or various other forms, or may be in the form of a wafer so as to permit two of such wafers to embrace sliced frozen confectionery material, such as brick ice cream.

By the term "cookie-like" material, as set forth in the claims, it is intended that said term also comprehend the use of various edible materials such as those made from cake mixtures or mixtures heretofore employed to produce ice cream cones and wafers for ice cream sandwiches.

Although I have herein shown and described a preferred embodiment of my invention, manifestly it is capable of modification without departing from the spirit and scope thereof. I do not, therefore, wish to be understood as limiting this invention to the precise form herein disclosed, except as I may be so limited by the appended claims.

I claim as my invention:

1. A shell for receiving and surrounding a body of edible confectionery material to be frozen therein, said shell being formed of cookie-like material and being provided with a plurality of spaced apart openings therethrough, into which said body of material is caused to flow, preparatory to freezing therein, and whereby to provide a plurality of projections extending laterally from the body into interlocking engagement with the shell when said body is frozen in the shell.

2. A shell for receiving and surrounding a body of edible confectionery material to be frozen therein, said shell being formed of cookie-like material and being provided with a plurality of spaced, narrow areas of reduced thickness, to define a plurality of small areas, and whereby severance will be effected mainly along said narrow areas, upon application of force in the process of eating the shell with the body of frozen material therein.

3. A shell for receiving and surrounding a body of edible confectionery material to be frozen therein, said shell being formed of cookie-like material and being provided with a plurality of spaced, narrow, intersecting, areas of reduced thickness, to define a plurality of small areas, and whereby severance will be effected mainly along said narrow areas, upon application of force in the process of eating the shell with the body of frozen material therein.

4. A shell for receiving and surrounding a body of edible confectionery material to be frozen therein, said shell being formed of cookie-like material and being provided with a plurality of spaced, intersecting grooves of V-shape cross section, defining a plurality of small areas, whereby severance of the shell will be effected along said grooves upon application of force in process of eating the shell with the body of frozen material therein.

5. A shell for receiving and surrounding a body of edible confectionery material to be frozen therein, said shell being formed of cookie-like material and being provided with a plurality of spaced apart openings therethrough, into which said body of material is caused to flow, preparatory to freezing therein, whereby to provide a plurality of projections extending laterally from the body into interlocking engagement with the shell when said body is frozen in the shell, and said shell being provided with a plurality of spaced, narrow areas of reduced thickness to define a plurality of small areas, and whereby severance will be effected mainly along said narrow areas, upon application of force in the process of eating the shell with the body of frozen material therein.

6. As a new confectionery article, a body of frozen confectionery material, and a shell of cookie-like material frozen to and surrounding said body, said body and shell being formed with interengaging features at a plurality of spaced apart points for firmly securing the shell and the body together as a unit.

7. As a new confectionery article, a body of frozen confectionery material, and a shell of cookie-like material frozen to and surrounding said body, said body and shell being formed with interengaging features at a plurality of spaced apart points around said body for firmly securing the shell and the body together as a unit.

8. As a new confectionery article, a body of frozen confectionery material, and a shell of cookie-like material frozen to and surrounding said body, said shell being formed with a plurality of spaced, narrow areas of reduced thickness, to define a plurality of small areas, whereby severance will be effected mainly along said narrow areas, upon application of force in the process of eating said article.

9. As a new confectionery article, a body of frozen confectionery material, and a shell of cookie-like material frozen to and surrounding said body, said body and shell being formed with interengaging features at a plurality of spaced apart points for firmly securing the shell and the body together as a unit, said shell being formed with a plurality of spaced, narrow areas of reduced thickness, to define a plurality of small areas, whereby severance will be effected mainly along said narrow areas, upon application of force in the process of eating said article.

10. As a new confectionery article, a body of frozen confectionery material, a shell of cookie-like material frozen to and surrounding said body, the outer surface of said shell being formed with a plurality of spaced, narrow areas of reduced thickness to define a plurality of small areas whereby severance will be effected mainly along said narrow areas upon application of force in the process of eating said article, and a coating of confectionery material surrounding the shell and filling said narrow areas whereby the latter assist in anchoring said coating to the shell.

KENNETH A. BEVINGTON.

REFERENCES CITED

The following references are of record in the file of this patent:

UNITED STATES PATENTS

| Number | Name | Date |
|---|---|---|
| 1,548,970 | York | Aug. 11, 1925 |
| 1,899,511 | Leaf | Feb. 28, 1933 |
| 1,929,906 | Skokowski | Oct. 10, 1933 |
| 1,947,010 | Jones | Feb. 13, 1934 |
| 2,355,915 | Hayden | Aug. 15, 1944 |